INVENTOR
Robert A. Wolf
BY
Beau, Brooks, Buckley & Beau.
ATTORNEYS

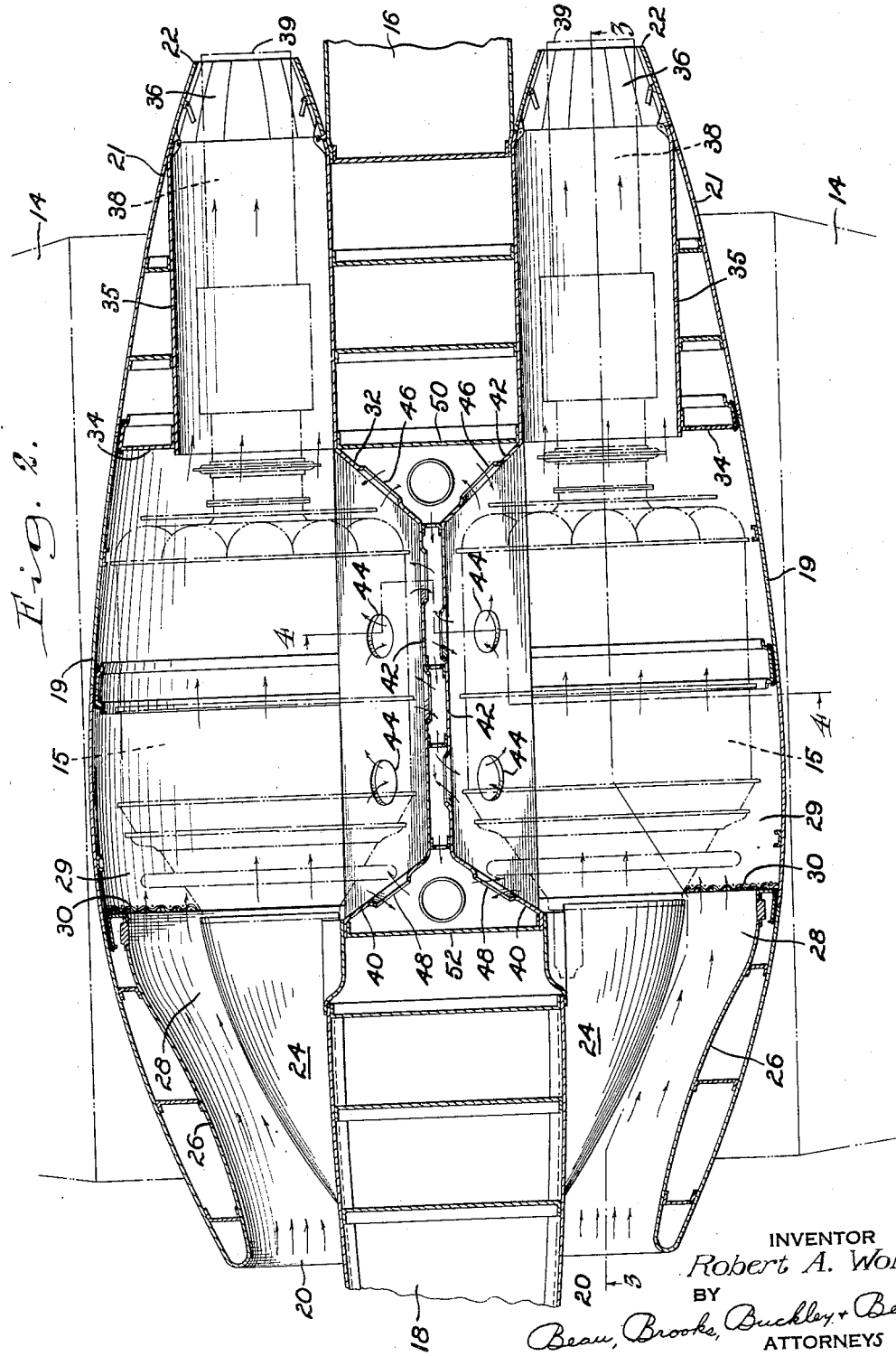

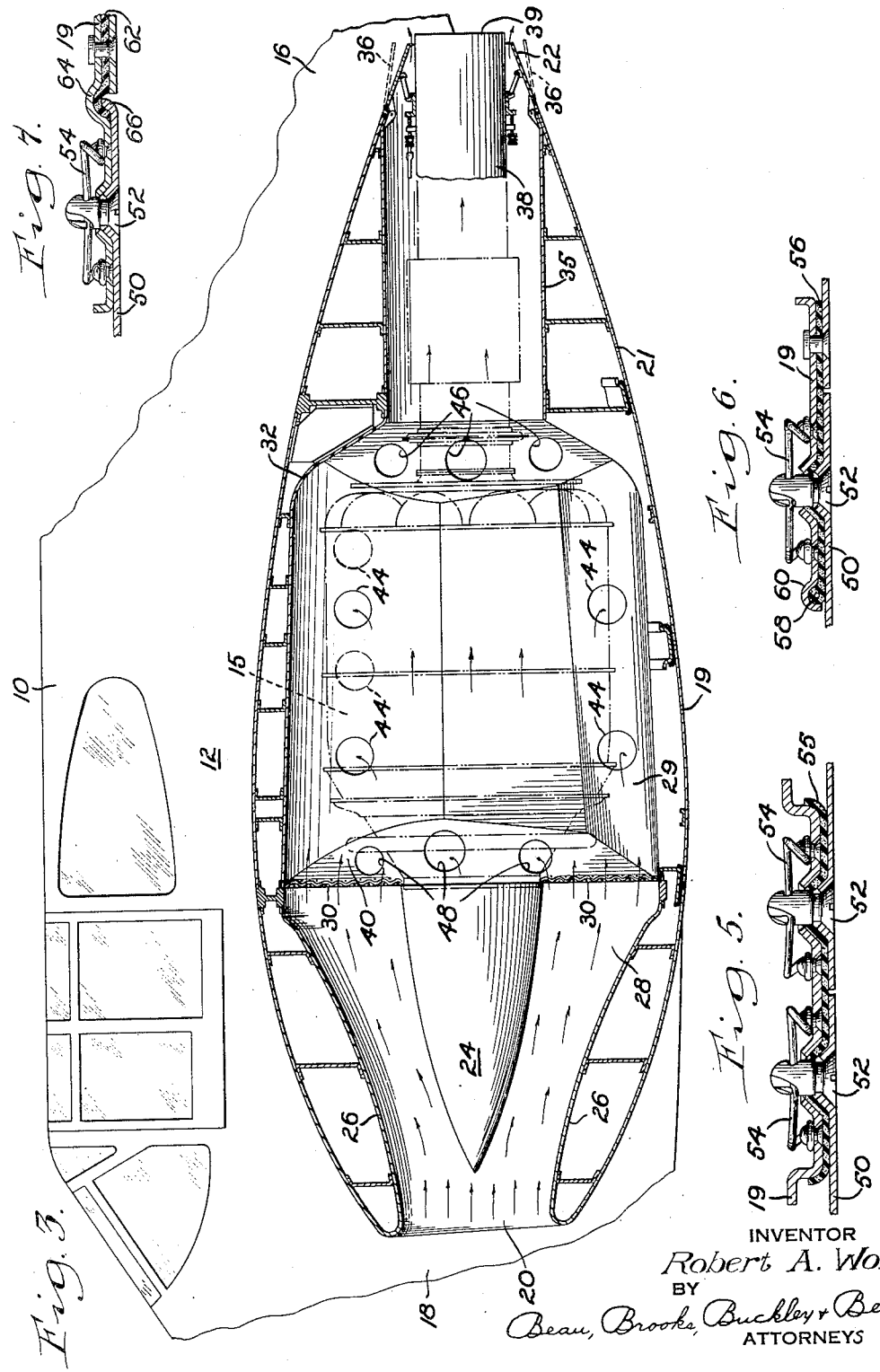

Patented Feb. 7, 1950

2,496,509

UNITED STATES PATENT OFFICE 2,496,509

AIRCRAFT POWER UNIT CONVERTING FLUID ENERGY INTO STATIC PRESSURE ENERGY

Robert A. Wolf, Kenmore, N. Y., assignor to Bell Aircraft Corporation, Wheatfield, Niagara County, N. Y.

Application March 21, 1946, Serial No. 656,031

7 Claims. (Cl. 244—74)

This invention relates to aircraft, and broadly to improvements in aircraft or other vehicles which are powered by reaction jet-propulsion devices or the like. More particularly the invention relates to vehicle power units wherein fluid energy due to motion of the vehicle is converted into static pressure energy for release to provide vehicle propulsion forces. Devices of the above character necessarily embody fluid pressure resistant cowling structures for inducing flow of the vehicle into atmosphere from externally of the vehicle into heat-exchange relation with the atmosphere-heating device of the mechanism and thence through the discharge jet arrangement; and it is a primary object of the present invention to provide improvements in multiple unit devices of the character described and of cowling structures in conjunction therewith. Other objects and advantages of the invention will appear in the specification hereinafter.

In the drawings:

Fig. 2 is a horizontal section, on an enlarged scale, as along line II—II of Fig. 1;

Fig. 3 is a vertical section, as along line III—III of Fig. 2;

Fig. 5 is a fragmentary section, as along line V—V of Fig. 4, showing a typical detachable cowl fastening and pressure sealing arrangement at the line of intersection of two cowling panels; and Figs. 6 and 7 are views similar to Fig. 5 of other suitable forms of sealing and fastening arrangements for the detachable cowling structures.

Figure 1:
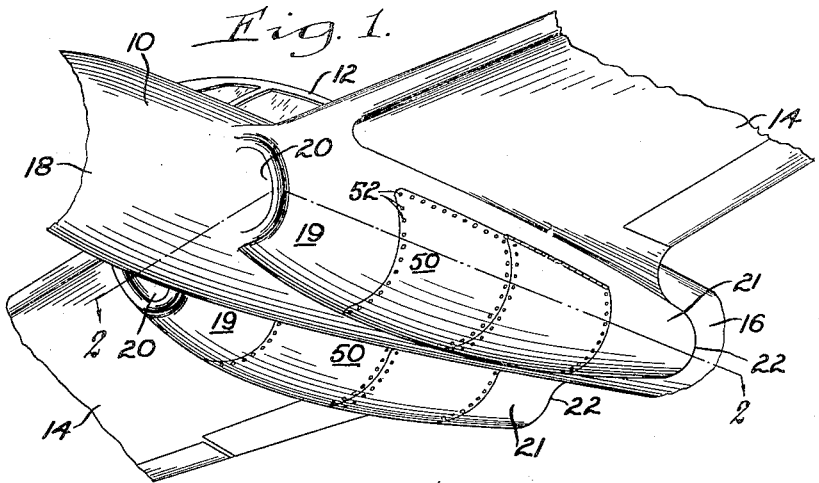
Fig. 1 is a fragmentary perspective from forwardly of and below the central body portion of an airplane embodying the invention.
Figure 4:
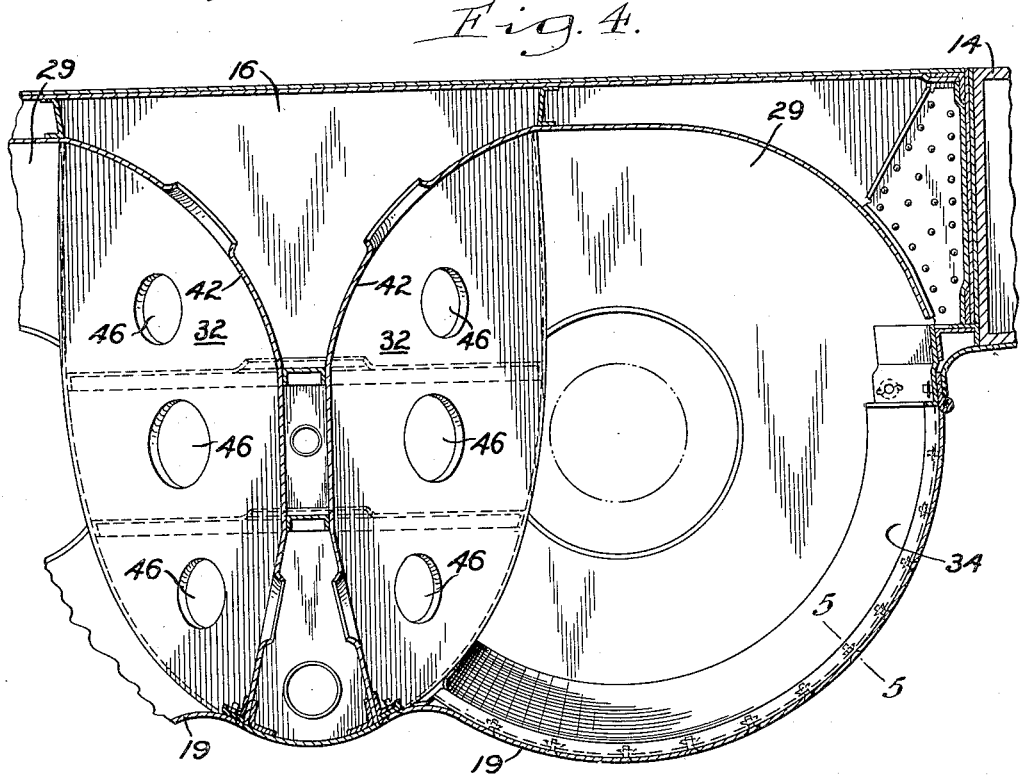
Fig. 4 is a fragmentary transverse vertical section, as along line IV—IV of Fig. 2.

The drawings illustrate the invention in conjunction with an aircraft comprising generally a central fuselage 10 which incorporates a passenger compartment 12; and wing panels 14—14 extending therefrom. The power supply mechanism of the airplane is illustrated as comprising a pair of compressor-heaters designated generally at 15—15 which are arranged in side-by-side relation as closely as possible along the thrust axis of the airplane. Thus, the power plants 15—15 are partially submerged within the contour lines of the fuselage and wing structures. The power devices are enclosed by a cowling structure which includes a rear central section 16 which forms substantially a continuation of the aircraft main fuselage 10; a nose central section 18 which extends forwardly from a position between the power units and terminates preferably in a streamlined end; and a power unit enclosing central section comprising a pair of generally tubular casings 19—19. Thus, the cowling structure resembles externally a pair of nacelle-like bodies disposed in parallel relation at opposite sides of the airplane fuselage so as to merge therewith and into the nose and tail structures 18—16 as illustrated in Fig. 1.

The cowling is so shaped as to provide a pair of air intake ports 20—20 at opposite sides of the nose portion 18; the ports 20—20 being each of generally oval front view form and defined at its upper and lower and outboard side portions by the shell contour of the casing 19, and at its inboard side by the shell contour of the fuselage nose 18. The cowling also includes at its rear end a pair of circularly sectioned streamlined casings 21—21 terminating in ports 22—22. A parti-cone shaped fairing 24 is disposed within each of the nose portions of the casings 19—19 as indicated in Figs. 2-3, and fairings 26—26 are provided interiorly of the nose ends of the casings 19—19 in spaced relation with the fairings 24—24 so as to define in cooperation therewith air passageways or air induction chambers 28—28 are crescent-shaped as viewed from the front of the airplane. The chambers 28—28 each open into an annularly sectioned air pressure chamber 29 surrounding the corresponding compressor-heater unit 15.

The outer wall portions of the air diffusion chambers 28—28 are so shaped in relation to the cone-shaped fairings 24—24 as to provide air passageways of constantly increasing sectional area for efficient conversion of air velocity energy into static pressure; the fairings 24—24 being designed to simultaneously provide the desired velocity gradient within the diffusion chambers as well as spaces interiorly of the fairings 24—24 for installation of power plant accessories and/or other equipment. The air pressure chambers 29—29 surrounding the power units 15—15 are so dimensioned as to be of sectional areas much greater than the diffusion chambers, whereby the air velocities within the pressure chambers are relatively low. Thus, air flow may be taken from any point in the pressure chamber without excessive losses of energy such as would otherwise be experienced for example due to obstructions of equipment installations within the chamber. An air diffusing screen 30 may be installed as shown in Figs. 2-3 to facilitate even dispersion of the incoming air throughout the pressure chamber.

The pressure chambers 29—29 are defined at their inboard sides and at their rear ends by plates 32—32, and by reducing bulkheads 34—34 at the bottom and outboard side portions thereof. Thus, the pressure chambers are arranged to discharge into tubes or tail pipes 35—35 which are fitted with adjustable flap shutter devices at 36—36 so as to provide variable area hot gas exit ports; and the compresser-turbine exhaust stacks 38—38 of the power units 15—15 are led through the pipes 35—35 to discharge at 39—39. At their front ends the compression chambers 29—29 are further defined by diverging side wall plates 40—40 which extend vertically at the inboard side portions of the pressure chambers. As shown in Fig. 3, the exterior skin portion 19 of the cowling structure is so shaped and arranged as to completely enclose the variable area diffusion chambers; the pressure chambers; and the tail pipes within a structure which is exteriorly streamlined longitudinally thereof.

The two pressure chambers 29—29 are arranged to be as close to each other as possible at their inboard sides, and it is a feature of the invention that the inboard side wall portions 42—42 of the pressure chambers are perforated as indicated at 44 to permit free flow of fluid from one pressure chamber to the other whenever there are differences of pressure at the various air entrances or exits; as for example, when the aircraft is flying in a yawed or side slipping attitude. Also, the end plates 32—32 are perforated as indicated at 46—46 and the end plates 40—40 are perforated as indicated at 48 to further facilitate equalization of fluid pressure between the chambers; end plates 50—52 being provided to span the perforated plates 32 and 40, respectively. Thus, the pressure communicating channels through the wall plates defining the pressure chambers operate to equalize the flow and pressure within the chambers, and the cowling arrangement produces in effect a single large pressure chamber with a multiplicity of entrances and exits.

As illustrated at Fig. 1, the cowling shells 19—19 are formed with access openings which are normally closed by detachable covers 50; whereby access to the power units 15—15 may be readily had for power unit repair and servicing purposes. In view of the operative pressure conditions interiorly of the chambers it is required that the detachable cover plates 50 be pressure-sealed when in operative position, and for this purpose the cover plates are provided with series of quick detachable screws 52 mounted along the edges of the cover plates 50, and cooperating spring nut devices 54 carried by the marginal edge portions of the fixed skin structure 19, as illustrated in Figs. 5—6—7. Fig. 5 illustrates one form of gasket arrangement to effect sealing between the fixed skin 19 and the cover 50, and in this arrangement the gasket comprises a soft compression type sheet 55 of any suitable gasket material. In Fig. 6 a gasket sheet 56 having a bead portion 58 is employed, and the skin sheet 19 is marginally curled as indicated at 60 to cooperate with the bead portion 58 of the gasket to effect an improved seal. In Fig. 7 another form of gasket is employed, and in this case the gasket sheet 62 is of flat form and extends over a recessed portion 64 of the skin sheet 19, and is thereby arranged to be squeezed into the recess 64 by an inturned flange portion 66 of the detachable cover plate 50 when the latter is in operative position.

Thus, it will be appreciated that the invention provides a novel structure for converting velocity energy into static pressure energy; the mechanism comprising a forwardly opening duct entrance, a diffusion passageway leading rearwardly from the entrance, a pressure chamber receiving fluid from the diffusion chamber, and a variable area exit discharging from the pressure chamber; with all of the aforesaid elements arranged within an aerodynamically and structurally efficient unit which is adapted to comprise the foundation frame of a modern aircraft. Thus, the invention provides an arrangement which is particularly adapted to be used in an airplane or other vehicle wherein fluid energy due to motion of the body is to be converted into static pressure energy within the body. Although the arrangement shown and described hereinabove illustrates a specific application utilizing a double air entry, one entrance being provided at each side of the airplane fuselage, the principles thereof will also apply to arrangements employing any number of entries as well as arrangements wherein the entries are formed in the airplane wing or in the fuselage nose, or in connection with any other suitable type of so-called ramming air entry.

More specifically, the invention provides for a multiplicity of air entries and pressure chambers and exits, with intercommunicating passageways extending between the pressure chambers whereby to equalize the pressure in the chambers under conditions of unequal pressures at the various entries and exits; and the invention further contemplates a diffuser duct with relatively low entrance velocity ratio and a large diffuser area ratio from entrance to exit into the pressure chamber, so as to provide maximum efficiencies of velocity conversion into static pressure.

Therefore, although only one form of the invention has been shown and described in detail it will be apparent to those skilled in the art that the invention is not so limited but that various changes may be made therein without departing from the spirit of the invention or the scope of the appended claims.

I claim:

1. An aircraft including a fuselage, a pair of jet type reaction-propulsion power units arranged in side-by-side relation upon said fuselage, a cowling enclosing said power units comprising a casing enveloping said units, said casing being open at the forward end thereof to receive a supply of rammed air thereinto, the wall portions of said casing being formed to substantially parallel the individual shapes of said power units, partition means extending interiorly of said cowling between said power units to provide separate air chambers surrounding said units, said partition means being apertured to permit an exchange of atmosphere therethrough from one air chamber to the other in response to static pressure differentials at opposite sides of said partition means.

2. An aircraft including a fuselage, a pair of power units arranged in side-by-side relation upon said fuselage, a cowling enclosing said power units comprising a casing enveloping said units, said casing being open at the forward end thereof to receive a supply of rammed air thereinto, partition means extending interiorly of said cowling between said power units to provide separate air chambers surrounding said units, said partition means being apertured to permit an exchange of atmosphere therethrough from one air chamber to the other in response to static pressure differentials at opposite sides of said partition means.

3. In a vehicle, a plurality of power units, a cowling enclosing said power units comprising a casing enveloping said units, said casing being open at the forward end thereof to receive a supply of rammed air thereinto, said casing being formed to substantially parallel the individual shapes of said power units and to include partition means extending interiorly of said cowling between said power units to provide separate air chambers surrounding said units, said partition means being apertured to permit an exchange of atmosphere therethrough from one air chamber to the other in response to static pressure differentials at opposite sides of said partition means.

4. In a vehicle, a plurality of jet type reaction-propulsion power units, a cowling enclosing said power units comprising a casing enveloping said units, said casing having intake openings at the forward end thereof to receive supplies of rammed air thereinto and openings at the rear end thereof for hot air exits, said casing being formed with side wall portions to substantially parallel the individual shapes of said power units and partition means extending interiorly of said cowling between said power units to provide separate air chambers surrounding said units, said partition means being apertured to permit exchange of atmosphere pressure therethrough in response to different pressure conditions at said intake and exit openings.

5. A structure for converting velocity energy into static pressure energy, said structure including a cowling enclosing a plurality of heating units, said cowling having plural openings at the forward end thereof to receive supplies of rammed air thereinto, a diffuser of increasing sectional area leading from each of said cowling openings, a pressure chamber of relatively large sectional area in communication with each of said diffusers, a heating device within each of said pressure chambers and a variable area exit nozzle for conveying the discharge from each of said chambers, said cowling including partitions extending between adjacent of said heating devices to divide the cowling into a plurality of air chambers, said partitions being apertured to permit equalization of pressures within said chambers, and an outer skin portion enclosing all of the above elements within an aerodynamically efficient casing adapted to comprise the basic frame portion of a vehicle.

6. In an aircraft, a cowling adapted to enclose a plurality of power units, said cowling having a plurality of openings at the forward end thereof to receive a supply of rammed air thereinto, the wall portions of said cowling being formed to substantially parallel the individual shapes of said power units, partition means extending interiorly of said cowling between said power units to provide separate pressure chambers surrounding said units, an exit port at the rear end of each of said pressure chambers, said partition means being apertured to permit an exchange of atmosphere therethrough from one pressure chamber to the other in response to different static pressures at the various entrances and exit ports, said cowling being provided with access openings in registry with said power units, cover plates including compression gasket devices for closing said access openings, and quick detachable locking means for holding said cover plates in operative position to pressure-seal said openings.

7. In an aircraft, a cowling adapted to enclose a plurality of power units, said cowling having a plurality of openings at the forward end thereof to receive a supply of rammed air thereinto, the wall portions of said cowling being formed to substantially parallel the individual shapes of said power units, partition means extending interiorly of said cowling between said power units to provide separate pressure chambers surrounding said units, and an exit port at the rear end of each of said pressure chambers, said partition means being apertured to permit an exchange of atmosphere therethrough from one pressure chamber to the other in response to different static pressures at the various entrances and exit ports.

ROBERT A. WOLF.

REFERENCES CITED

The following references are of record in the file of this patent:

UNITED STATES PATENTS

| Number | Name | Date |
| --- | --- | --- |
| 1,427,872 | Verville | Sept. 5, 1922 |
| 2,432,359 | Streid | Dec. 9, 1947 |